July 11, 1944.     F. M. PYZEL     2,353,500
PROCESS OF SEPARATING AND RECOVERING HYDROCARBONS
AND ALKYL ESTERS FROM MIXTURES THEREOF
Filed July 8, 1940
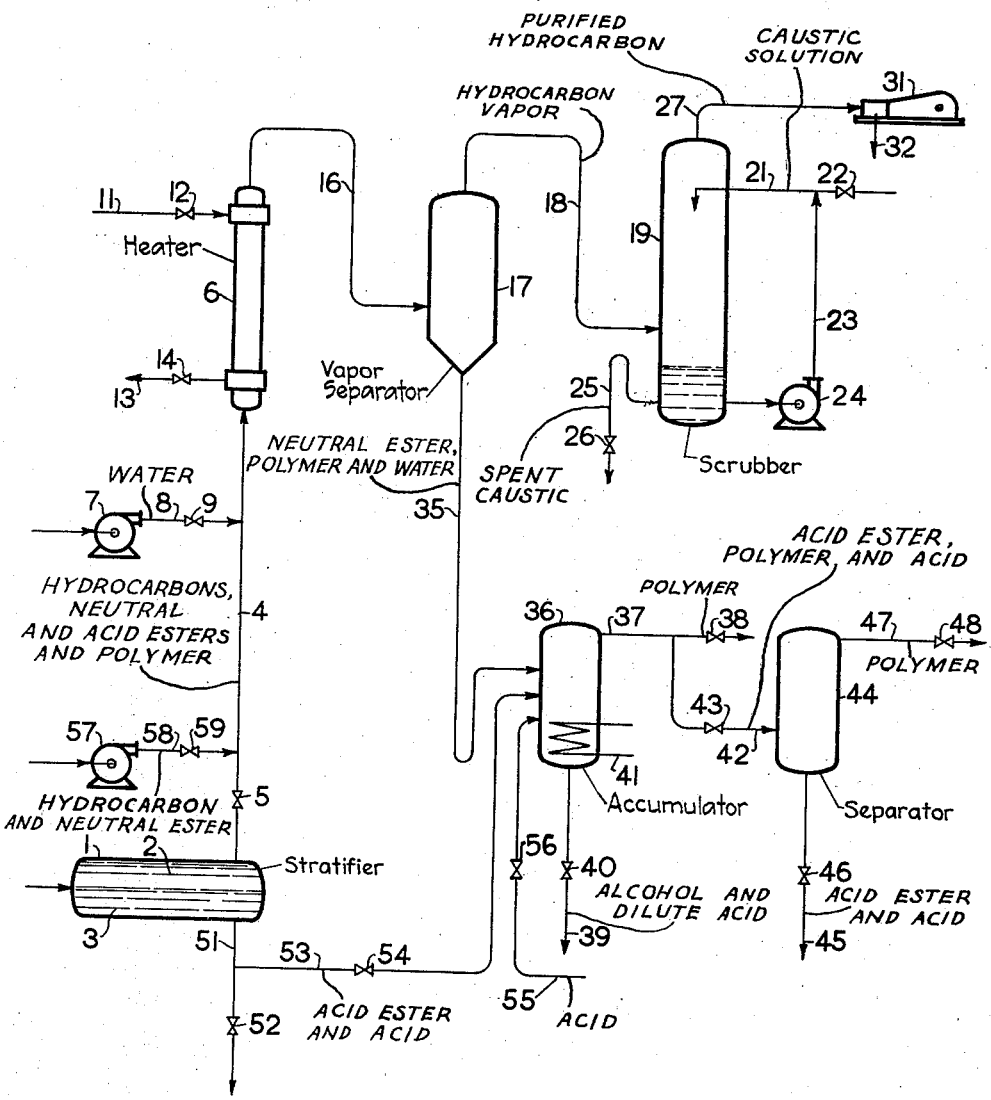
Inventor: Frederic M. Pyzel
By his Attorney Millard L. Caldwell Patented July 11, 1944

2,353,500

UNITED STATES PATENT OFFICE 2,353,500

PROCESS OF SEPARATING AND RECOVERING HYDROCARBONS AND ALKYL ESTERS FROM MIXTURES THEREOF

Frederic M. Pyzel, Piedmont, Calif., assignors to Shell Development Company, San Francisco, Calif., a corporation of Delaware Application July 8, 1940, Serial No. 344,344

3 Claims. (Cl. 260—460)

This invention relates to a process for separating hydrocarbons and poly- or neutral alkyl esters from mixtures thereof or from admixture with polymerized hydrocarbons and alkyl acid esters. It relates more particularly to a continuous process for the separation and recovery of lighter hydrocarbons and polyalkyl or neutral esters from products obtained in the absorption of olefines in a polybasic inorganic acid in which process a polyalkyl or neutral ester-containing hydrocarbon layer separated from the absorption product is rapidly heated in the presence of substantial quantities of water substantially free of active chemicals to effect the vaporization of lighter hydrocarbons which are recovered as a final product and the unvaporized products are further heated to effect the hydrolysis of poly- or neutral alkyl esters.

In processes such as, for example, the manufacture of alcohols, ethers, esters and similar products wherein olefine-containing hydrocarbons from any suitable source are contacted with polybasic inorganic acids of appropriate concentration there is obtained an "acid liquor" comprising free acid, alkyl acid esters, polyalkyl esters, unreacted hydrocarbons and polymerized hydrocarbons. During the operation a hydrocarbon phase comprising unreacted hydrocarbons, polymerized hydrocarbons and polyalkyl esters is separated from the acid liquor. Upon dilution of the acid liquor to the proper degree before separation of the hydrocarbon phase, substantially all of the polyalkyl ester will separate in the hydrocarbon phase.

Heretofore, when the hydrocarbon phase comprising the polyalkyl esters was not discarded as waste, resort was had to highly uneconomical methods for the recovery of a part or all of the constituents. Strong acid treatments were used to recover the hydrocarbon content with destruction of the valuable polyalkyl esters. Under ordinary distilling conditions the polyalkyl esters decompose readily and rapidly and recourse was had to modified distilling processes in which the use of neutralizing agents is found to be essential to prevent decomposition of the desirable esters. In addition to the disadvantages presented by these processes in their need for effective separation and recovery of neutralizing agents, their operation in an economical manner is rendered difficult by the tendency of the esters to saponify resulting in emulsions which greatly increase the problem and cost of separation of the desired final products.

It is an object of the present invention to provide a novel process for the substantially complete separation and recovery of lighter hydrocarbons from admixture with polymerized hydrocarbons or alkyl acid esters or polyalkyl esters or from mixtures comprising one or all of these materials.

It is a further object of the invention to provide a novel, simple process for the substantially complete separation of hydrocarbons from mixtures comprising hydrocarbons and polyalkyl esters in the substantially complete absence of polyalkyl ester decomposition.

Another object of the invention is to provide a novel process for economically and efficiently separately recovering lighter hydrocarbons and polyalkyl esters from mixtures containing them obtained as a product in contacting olefine-containing hydrocarbons with acid absorption media, which process is particularly adapted to the conversion of the separated polyalkyl esters to valuable hydrolysis products.

It has been found that mixtures comprising hydrocarbons and polyalkyl esters of polybasic inorganic acids may be heated in a continuous stream to the vaporizing temperatures of the lighter hydrocarbon components or to moderately higher temperatures in the presence of substantial quantities of added water with a minimum of ester decomposition. In accordance with the invention a mixture, such as is obtained, for example, by separation from the product resulting from contacting of olefine-containing hydrocarbons with a polybasic inorganic acid, and comprising lighter hydrocarbons, polymerized hydrocarbons and neutral esters, is admixed with substantial quantities of water and heated in a continuous stream to a temperature of, for example, from about 20° C. to about 60° C. The heated aqueous mixture is passed into a vaporizing zone wherein lighter hydrocarbons are separated by flash vaporization. The unvaporized products comprising polymers, esters and water are drawn from the vaporizing zone and water is separated therefrom by stratification. In a preferred method of operation the unvaporized products are subjected to hydrolyzing conditions to effect the conversion of esters to valuable hydrolyzed products such as, for example, alcohols.

Mixtures, comprising hydrocarbons and neutral esters, treated in the process of the invention may be obtained from any suitable source. They may, for example, be produced by the absorption of olefine-containing hydrocarbons in a suitable acid absorption medium. As suitable starting material for the preparation of olefine absorption products which may be treated by the process of the invention, hydrocarbons derived from mineral oils as petroleum, shale oil, and the like, or from mineral oil products, or from natural gas, or from coal, peat and like carboniferous natural materials, may be used, as well as those derived from animal or vegetable oils, fats and/or waxes. The olefines present in such starting material may be of natural occurrence, or the result of vapor or liquid phase cracking or hydrogenation, distillation or other pyrogenetic treatment. The olefines may be used in a pure state, either as individual olefines or pure olefinic mixtures or in admixture with paraffins or other compounds which may be considered inert in the absorption process. Furthermore, such olefines may comprise hydrocarbon fractions consisting of, or predominating in, hydrocarbons containing the same number of carbon atoms to the molecule, or of mixtures of non-isomeric hydrocarbons. Ethylene and/or secondary olefines (i. e. olefines, both iso and normal which yield secondary alcohols on hydrolysis of their acid absorption products) as propylene, butene-1 and -2, pentene-1 and -2, isopropyl ethylene and higher homologues and analogues thereof may thus be used. Tertiary olefines (iso-olefines which yield tertiary alcohols) as isobutylene, trimethylethylene, unsymmetrical methyl ethyl ethylene and the like may be present in the olefinic or hydrocarbon mixtures used as raw material and may be absorbed simultaneously with the secondary olefines.

Any suitable acid-acting medium may be used for the absorption of such olefines in the preparation of the hydrocarbon mixtures to which the invention is applicable. Thus inorganic acids, of which dithionic, sulfuric phosphoric and pyrophosphoric are typical; or organic acids as benzene, sulfonic, naphthalene sulfonic, toluene sulfonic and homologues and analogues thereof; or "acid liquors" such as are obtained by the absorption of olefines in acid-acting media such as the above; and/or solutions or suspensions of acid-acting salts as sodium bisulfate and the like may be used.

The method or conditions chosen for carrying out the olefine absorption are not material to the successful execution of the invention, although the composition of the resulting hydrocarbon mixture which is the starting material in the novel process may be greatly affected thereby. This is particularly true of the polymer and poly- or neutral alkyl ester content which may vary widely under different conditions of olefine absorption. In fact, either the poly- or neutral ester content, for example, may even be negligibly small. Similarly any desired method may be used for separating the immiscible hydrocarbon phase from the absorption product and the separation may be effected with or without dilution of the absorption product and either before or after other treatment thereof. In any case poly or neutral alkyl esters such, for example, as dipropyl sulfate, $(C_3H_7)_2SO_4$; dibutyl sulfate, $(C_4H_9)_2SO_4$; dibutyl hydrogen phosphate, $(C_4H_9)_2HPO_4$; triamyl phosphate $(C_5H_{11})_3PO_4$, and the like, and/or free acid will be present in the starting material of the process.

For the purpose of affording a clear understanding of the invention, reference will now be made to the attached drawing forming a part of this specification and in which the single figure represents a more or less diagrammatical elevational view of one form of apparatus suitable for carrying out the process in accordance with the invention.

For the purpose of clearer understanding, the illustrative description of the process will be directed to the separate recovery of a pure butane-butene fraction from the residual hydrocarbon layer obtained in the preparation of secondary butyl alcohol and to the conversion of the neutral esters in the hydrocarbon layer to valuable hydrolysis products. It will be understood, however, that the invention is not limited to this specific application of the invention.

Suitable charging material for the process may be obtained by contacting a substantially pure butane-butene fraction, from which isobutylene has been removed by conventional methods, with a polybasic inorganic acid. The butane-butene fraction may, for example, have the following composition:

| | Per cent by wt. |
|---|---|
| Butane | 78.0 |
| Butene 1 and 2 | 21.7 |
| Gamma butylene | 0.3 |

Sulfuric acid having an acid content of about 85 to 100% may be used as the polybasic acid and the absorption may be effected at a temperature in the range of, for example, from 16 to 30° C. The resulting products are charged to a separating zone.

In the drawing, chamber 1 functions as the separating zone for the products from the absorption operation and also as a suitable source of supply for the charge for the process of the invention. Products within chamber 1 will stratify into a supernatant hydrocarbon layer 2, having, for example, the following composition:

| | Per cent by wt. |
|---|---|
| Dibutyl sulfate | 10.4 |
| Polymers | 1.7 |
| Butane | 85.3 |
| Butene 1 and 2 | 2.6 |

Lower layer 3 will comprise alkyl acid sulfate, free acid and a small amount of free alcohol.

By means of pressure maintained upon chamber 1, or by separate pumping means not shown in the drawing, the hydrocarbon layer 2, is forced through line 4, controlled by valve 5 into a heating zone. The heating zone may consist of an indirect heat exchanger 6. Prior to passage into indirect heat exchanger 6 the stream flowing through line 4 is admixed with water, substantially free of active chemicals, drawn from an outside source and forced by means of a pump 7 through line 8, controlled by valve 9, into line 4. Within indirect heat exchanger 6, the diluted stream is rapidly raised to the vaporizing temperature of butane at operating conditions by indirect heat exchange with a suitable heating medium. The heating medium may consist, for example, of water, steam, oil, etc., heated to the desired temperature by means not shown in the drawing, and is passed through the hot side of indirect heat exchanger 6 by means of inlet line 11, controlled by valve 12, and outlet line 13, controlled by valve 14. Good results have been obtained by maintaining the hot side of exchanger 6 at a temperature in the range of 20° to 60° C. for example, about 25° C. when operating under a pressure of, for example, about 5 lbs. gauge. If desired, the water introduced into line 4 through line 8 may be heated by means not shown in the drawing, prior to its introduction into line 4, to a temperature sufficiently high to provide a part or all of the heat required to raise the resulting diluted stream to the desired temperature. When all of the required heat is provided by the added preheated water, heat exchanger 6 will function in its capacity of a mixing zone to assure the formation of an intimate mixture having an even temperature distribution.

The amount of water introduced into the stream entering exchanger 6 may vary within wide limits and will depend in part upon the composition of the charge, the nature of its components and the operating conditions. Since an excess of water is found to be beneficial, cognizance is taken at this stage of the operation of the ratio of water to ester content desired in a subsequent step of the operation described below, and the amount of water introduced through line 8 is controlled accordingly, thus attaining in a simultaneous operation the beneficial effect of the presence of the water in the stream in exchanger 6, the preheating of the water required at higher temperature in a subsequent step of the process as well as the proportioning of the ratio of water to ester required in the subsequent steps. It is essential, however, that sufficient water be present to obtain uniform heating of the stream and dilution of any small amounts of sulphuric acid present in the charge to indirect heat exchanger 6, or formed therein by decomposition of small amounts of the ester component, since the presence of traces of the acid in concentrated form will catalyze to a substantial degree further decomposition of the ester. Additions of water in the amount of, for example, from about one-half to about one and one-half parts by weight of the dibutyl sulfate present in the mixture charged give excellent results.

Atmospheric or superatmospheric pressure may be maintained in indirect heat exchanger 6. A pressure of, for example, from atmospheric to about 25 lbs. gauge, and preferably about 5 lbs. gauge is found to be highly satisfactory. The mixture is preferably heated at a rapid rate, and maintained in heat exchanger 6 for not more than about 5 minutes and preferably less than 2 minutes. It is intended that the heating be effected in exchanger 6 in the substantially complete absence of ester hydrolysis or decomposition of any nature whatever.

From exchanger 6 the stream is passed through line 16 into an enlarged separating zone, for example, a chamber 17, wherein the vapors of lighter hydrocarbons comprising butane and butenes are separated from unvaporized products and passed through line 18 into a scrubbing zone. The scrubbing zone may consist of a tower 19 suitably equipped with trays or baffles or packed in part with suitable packing material such as, for example, Raschig rings. Within tower 19 the vapors are passed countercurrently to a caustic solution introduced into the top of tower 19 through line 21, controlled by valve 22, to effect the removal of any acidic materials in the vapors. A line 23 and pump 24 are provided to permit return of caustic solution from the lower part of tower 19 into line 21. Spent caustic solution is withdrawn from the lower part of tower 19 through line 25 controlled by valve 26. Additional purification of vapors in scrubber 19, such as water washing and drying may be resorted to if desired.

Butane-butene vapors are taken overhead from tower 19 through line 27 and passed to a compressor 31 wherein they are compressed. The compressed vapors are passed from compressor 31 through line 32 to any desirable cooling means not shown in the drawing to effect their liquefaction. The butane-butene product obtained as a product of the process will consist, for example, of about 96.9 to about 98.2% by weight of butane the remaining part predominating in butenes.

Unvaporized products comprising dibutyl sulfate, polymers and water are drawn from the lower part of chamber 17 and passed through line 35 into accumulator 36. Within accumulator 36 the products may be permitted to stratify into a hydrocarbon layer consisting of polymers and dibutyl sulfate which may be drawn therefrom through line 37 controlled by valve 38, and a water layer drawn therefrom through line 39 controlled by valve 40. The hydrocarbon layer drawn through line 39 may be removed as a final product of the process and will consist, for example, of:

| | Per cent by weight |
|---|---|
| Polymer | 13.2 |
| Dibutyl sulfate | 78.8 |
| C4 hydrocarbons | 8.0 |

This is a recovery of about 98.5% of the dibutyl sulfate charged to the process. If stratification is rendered difficult polymer may be returned from an outside source to chamber 36 to decrease the specific gravity of the ester-polymer mixture.

Separation of dibutyl sulfate from the polymer may be effected by any suitable method. In accordance with the process of the invention accumulator 36 may be caused to function as a hydrolyzer by applying heat thereto from any suitable source. Thus a closed coil 41 may be positioned in the lower part of accumulator 36, through which a suitable heating medium may be passed, as for example, steam, to raise the contents of accumulator 36 to a temperature in excess of about 70° C. Maintenance of the contents of accumulator 36 under these conditions will convert dibutyl sulfate to secondary butyl alcohol dissolved in dilute sulfuric acid which may be drawn from accumulator 36 through line 39 controlled by valve 40. Separation of the alcohol may be effected by distillation. Supernatant polymer is drawn from accumulator 36 through line 37. Though not shown in the drawing, suitable stirring means may be provided in accumulator 36 when this chamber is used as a hydrolyzer. Chamber 17 and line 35 may be insulated with suitable insulating means to prevent heat loss by radiation.

If desired, the dibutyl ester may be converted to secondary butyl alcohol by introduction of acid or alkyl acid esters into accumulator 36 in controlled amounts. Thus a part or all of layer 3 in separator 1, comprising butyl acid sulfate and sulfuric acid may be passed through lines 51 and 53, controlled by valves 52 and 54, respectively, into accumulator 36. By proper control of temperature and water content, substantially all of the dibutyl ester as well as the acid alkyl ester within accumulator 36 may thus be hydrolyzed. In a further modification of the process sulfuric acid may be passed from an outside source through line 55 controlled by valve 56 into accumulator 36 in sufficient amounts and in suitable concentration to maintain the contents therein at an acid concentration of, for example, above about 60%, thereby converting the dibutyl ester to the acid ester. When operating in this wise a mixture of polymer, alkyl-acid ester and free acid may be drawn continuously from accumulator 36 through lines 37 and 42 into a separator 44 wherein separation of a polymer layer from an acid-alkyl acid ester layer may be effected by stratification. The resulting polymer may be withdrawn through line 47, controlled by valve 48, and the acid-alkyl acid ester layer may be withdrawn through line 45, controlled by valve 46.

It is to be pointed out that whatever method is used to hydrolyze the dialkyl ester in accumulator 36 the ratio of water to ester desired for the hydrolysis operation may be obtained by judicious control of the amount of water added through line 8 above the minimum required to effect the substantially complete separation of butane and butene within separator 17 in the substantial absence of ester decomposition therein or in heat exchanger 6. If desired, additional water from an outside source may be introduced into chamber 36 by means not shown in the drawing.

If desired, mixtures comprising hydrocarbons and dialkyl esters obtained from any suitable outside source may be forced by means of pump 57 through line 58, controlled by valve 59 into line 4 and these may constitute additional or the sole charge to the process.

*Example I*

Mixtures containing polymer, dibutyl sulfate, butane and butenes in the proportions indicated in the table below, in admixture with water in the amount of about 0.6 part by weight of water to about 1 part by weight of dibutyl sulfate in the mixture, were passed through an indirect heat exchanger wherein they were subjected to indirect heat exchange with hot water. Vapors comprising butane and butene were separated from unvaporized products and the decomposition of dibutyl sulfate was measured by determining the olefine content of the vaporized hydrocarbons. In the following table, the results obtained when operating at a pressure of about 5 lbs. gauge and maintaining the heat exchanger at 25° C., 35° C., and 50° C. are recorded:

| | | | | | | |
|---|---|---|---|---|---|---|
| Temperature °C | 25 | 25 | 25 | 35 | 35 | 50 |
| Dibutyl sulfate throughput lbs./hr | 920 | 860 | 1,060 | 820 | 980 | 1,160 |
| Composition of charge: | | | | | | |
| Dibutyl sulfate per cent by wt | 11.4 | 9.8 | 10.4 | 10 | 9.4 | 10.2 |
| Polymer do | 0.4 | 1.3 | 1.7 | 1.3 | 1.2 | 0.8 |
| $C_4H_8$ do | 1.5 | 1.9 | 2.6 | 2.7 | 1.5 | 1.7 |
| $C_4H_{10}$ do | 86.7 | 87.0 | 85.3 | 86 | 87.9 | 87.3 |
| Composition of vapors: | | | | | | |
| $C_4H_8$ do | 1.8 | 2.2 | 3.0 | 3.1 | 1.8 | 2.0 |
| $C_4H_{10}$ do | 98.2 | 97.9 | 97.0 | 96.9 | 98.2 | 98.0 |
| Percent dibutyl sulfate decomposed | 2 | 1 | 1 | 1 | 1 | 2 |

These figures indicate a substantially complete separation of $C_4$ hydrocarbons from the mixture charged with a maximum dibutyl sulfate decomposition of 2%.

*Example II*

A hydrocarbon-dibutyl sulfate mixture having the following composition:

| | Per cent by wt. |
|---|---|
| Dibutyl sulfate | 9.8 |
| Polymer | 1.3 |
| $C_4H_8$ | 1.9 |
| $C_4H_{10}$ | 87.0 | admixed with water in the ratio of about one-half part by weight of water to one part by weight of dibutyl sulfate in the mixture was passed in a continuous stream through a heater maintained at 25° C. and a pressure of 5 lbs. gauge. Vaporized butane and butene were separated from unvaporized products.

The recovery gas had a composition of 97.9% by weight of butane and 2.2% by weight butenes.

The unvaporized hydrocarbon-dibutyl sulfate mixture had the following composition:

| | Per cent by wt. |
|---|---|
| Polymer | 11.8 |
| Dibutyl sulfate | 80.6 |
| $C_4H_{10}$ | 7.6 |

This is a recovery of 99% of the dibutyl sulfate charged.

It is to be understood that the invention is in no wise limited in its application to the separation and recovery of the specific compounds mentioned in the foregoing detailed description of one preferred embodiment of the invention set forth for the purpose of making the invention more clear and that the conditions of operation may vary widely within the scope of the invention and will be determined by the nature of the materials treated. The invention is to be regarded as limited only by the following claims, in which it is intended to claim all novelty inherent therein as broadly as is possible in view of the prior art.

I claim as my invention:

1. Process for separating a hydrocarbon from a polyalkyl ester-containing hydrocarbon mixture obtained as a product in contacting olefine-containing hydrocarbons with an acid absorbing medium which comprises, diluting the mixture with water substantially free of active chemicals in the amount of at least one-half part by weight of water to one part by weight of polyalkyl ester present but not exceeding the amount of water desired to hydrolyze the polyalkyl ester at a hydrolyzing temperature, rapidly heating the diluted mixture in continuous stream to a temperature at least sufficiently high to vaporize the hydrocarbon but below the temperature at which decomposition of the polyalkyl ester is encountered, separating vaporized hydrocarbons from unvaporized products, further heating the unvaporized products to a temperature at which substantial hydrolysis of polyalkyl ester will be effected, maintaining the hydrolyzing temperature until substantially all of the polyalkyl ester content has been hydrolyzed, and separating an aqueous layer comprising polyalkyl ester hydrolysis products from a hydrocarbon layer by stratification.

2. In a process for recovering butane and dibutyl sulfate from an acid mixture comprising butane, dibutyl sulfate, butyl acid sulfate and butene polymers wherein a dibutyl sulfate-containing hydrocarbon layer is separated from a butyl acid sulfate-containing layer, the steps of diluting the dibutyl sulfate-containing layer with water in the amount of at least one-half part by weight of water to one part by weight of dibutyl sulfate present, rapidly heating the diluted mixture in a continuous stream to vaporize butane without substantial decomposition of dibutyl sulfate, separating butane vapors from unvaporized products, further heating the unvaporized products in the presence of at least a part of said butyl acid sulfate-containing layer to effect hydrolysis of esters, and separating an aqueous product of ester hydrolysis from remaining hydrocarbons.

3. In a process for recovering hydrocarbons and alkyl esters from an acid mixture comprising unreacted hydrocarbons, neutral alkyl esters, alkyl acid esters and hydrocarbon polymers obtained as a product in contacting olefine-containing hydrocarbon mixtures with an acid absorbing medium wherein a neutral ester-containing hydrocarbon layer is separated from an alkyl acid ester-containing layer, the steps of diluting the hydrocarbon layer with water in the amount of at least one-half part by weight of water to one part by weight of neutral ester present but not exceeding the amount of added water desired in a subsequent hydrolysis operation, rapidly heating the diluted mixture in a continuous stream to a temperature sufficiently high to vaporize at least a part of the hydrocarbon content but below the temperature at which substantial decomposition of neutral alkyl ester is encountered, separating vaporized hydrocarbons from unvaporized products, further heating unvaporized products in the presence of at least a part of said alkyl acid ester-containing layer to effect the simultaneous hydrolysis of neutral and acid esters, and separating an aqueous product of the ester hydrolysis from remaining hydrocarbon polymers.

FREDERIC M. PYZEL.